(12) United States Patent
Lokkers et al.

(10) Patent No.: US 9,914,554 B2
(45) Date of Patent: Mar. 13, 2018

(54) APPARATUS FOR PACKAGING DOSED QUANTITIES OF MEDICINES AND METHOD FOR OPERATING SUCH APPARATUS

(71) Applicant: BD Switzerland Sàrl, Eysins (CH)

(72) Inventors: Eddy R. Lokkers, Espeet (NL); John Van De Koot, Doornspijk (NL); Arie Van Wijngaarden, Putten (NL); Sjoerd Boomsma, Huizen (NL); Stephan Ganter, München (DE); Minne Jorritsma, Nigtevecht (NL)

(73) Assignee: BD SWITZERLAND SÀRL, Eysins (CH)

( * ) Notice: Subject to any disclaimer, the term of this patent is extended or adjusted under 35 U.S.C. 154(b) by 310 days.

(21) Appl. No.: 14/423,313

(22) PCT Filed: Aug. 16, 2013

(86) PCT No.: PCT/EP2013/067159
§ 371 (c)(1),
(2) Date: Feb. 23, 2015

(87) PCT Pub. No.: WO2014/032995
PCT Pub. Date: Mar. 6, 2014

(65) Prior Publication Data
US 2015/0251789 A1   Sep. 10, 2015

(30) Foreign Application Priority Data

Aug. 31, 2012   (EP) .................................... 12182654

(51) Int. Cl.
B65B 37/00   (2006.01)
B65G 43/00   (2006.01)
(Continued)

(52) U.S. Cl.
CPC ............ *B65B 37/005* (2013.01); *B65B 5/103* (2013.01); *B65B 37/02* (2013.01); *B65G 17/12* (2013.01);
(Continued)

(58) Field of Classification Search
CPC ....... B65B 37/005; B65B 5/103; B65B 3/003; B65B 3/006; B65B 39/145; B65G 1/137;
(Continued)

(56) References Cited

U.S. PATENT DOCUMENTS 3,746,130 A   7/1973   Bullas
3,925,960 A * 12/1975   Saari .................... B65B 37/005
                                                            141/155
(Continued)

FOREIGN PATENT DOCUMENTS

CN   1771164 A   5/2006
EP   0499276 A1   8/1992
(Continued)

OTHER PUBLICATIONS

International Search Report dated Oct. 25, 2013 for International Application No. PCT/EP2013/067159.
(Continued)

*Primary Examiner* — Stephen F Gerrity
*Assistant Examiner* — Joshua Kotis
(74) *Attorney, Agent, or Firm* — McDermott Will & Emery LLP

(57) ABSTRACT

An apparatus for packaging dosed quantities of medicines and method for operating such apparatus. The apparatus includes multiple dosing stations for dispensing solid drug portions, and multiple collectors for collecting dosed quantities of solid drug portions and for forwarding the dosed quantities of solid drug portions to a packaging station. Each dosing station has an outlet and each collector has a unique (Continued)

collector identifier. A conveyor includes multiple mounting elements arranged in a chain, wherein each collector is detachably mounted to one of the mounting elements and moved by the conveyor along the dosing stations, so that the collector can receive the solid drug portions dispensed at the outlets of the dosing stations. A controller controls the operation of the dosing stations, the conveyor and the packaging station. Input means (80, 81) are coupled to the control means (19) for inputting the collecting means identifier. The controller maintains a mapping between identifiers assigned to each mounting element or mounting position and the unique collector identifiers of the collectors.

18 Claims, 11 Drawing Sheets

(51) Int. Cl.
| | | |
|---|---|---|
| *B65B 5/10* | (2006.01) | |
| *B65B 37/02* | (2006.01) | |
| *B65G 17/12* | (2006.01) | |
| *B65G 37/00* | (2006.01) | |
| *B65G 45/10* | (2006.01) | |
| *G07F 17/00* | (2006.01) | |
| *G07F 11/26* | (2006.01) | |

(52) U.S. Cl.
CPC ............. *B65G 37/00* (2013.01); *B65G 43/00* (2013.01); *B65G 45/10* (2013.01); *G07F 11/26* (2013.01); *G07F 17/0092* (2013.01)

(58) Field of Classification Search
CPC ........ B65G 17/12; B65G 47/18; B65G 47/20; B65G 47/44; B65G 2201/027; B65G 2812/02613–2812/02851; B65G 2812/08; B65G 2812/081; B65G 2812/084; B65G 17/002; B65G 17/005; G07F 11/26; G07F 17/0092
USPC ........................................ 221/9; 53/154, 237
See application file for complete search history.

(56) References Cited

U.S. PATENT DOCUMENTS

| | | | | |
|---|---|---|---|---|
| 4,874,281 | A * | 10/1989 | Bergerioux | B07C 3/02 186/55 |
| 5,481,855 | A * | 1/1996 | Yuyama | B65B 1/06 53/168 |
| 6,208,908 | B1 * | 3/2001 | Boyd | G06Q 10/087 198/349 |
| 6,792,736 | B1 | 9/2004 | Takahashi et al. | |
| 7,637,078 | B2 * | 12/2009 | Ishiwatari | B65B 5/103 221/21 |
| 7,950,206 | B2 * | 5/2011 | Knoth | B65B 5/103 221/1 |
| 2002/0162850 | A1 * | 11/2002 | Yuyama | B65B 5/103 221/124 |
| 2004/0108323 | A1 * | 6/2004 | Shows | G06F 19/3462 221/9 |
| 2004/0247421 | A1 | 12/2004 | Saunders et al. | |
| 2006/0070352 | A1 * | 4/2006 | Momich | B65B 39/001 53/437 |
| 2007/0022713 | A1 * | 2/2007 | Yuyama | B65B 35/04 53/255 |
| 2007/0277477 | A1 * | 12/2007 | Kim | B65B 5/103 53/154 |
| 2010/0030371 | A1 * | 2/2010 | Chudy | A47B 63/062 700/215 |
| 2010/0219050 | A1 * | 9/2010 | Deyanov | B65G 15/105 198/842 |
| 2013/0310969 | A1 * | 11/2013 | Terzini | G06F 19/3462 700/235 |

FOREIGN PATENT DOCUMENTS

| | | |
|---|---|---|
| EP | 1612146 A1 | 1/2006 |
| GB | 2240543 A | 8/1991 |

OTHER PUBLICATIONS

Written Opinion of the International Searching Authority dated Oct. 25, 2013 for International Application No. PCT/EP2013/067159.

\* cited by examiner

APPARATUS FOR PACKAGING DOSED QUANTITIES OF MEDICINES AND METHOD FOR OPERATING SUCH APPARATUS

CROSS-REFERENCE TO RELATED APPLICATION

This application is the U.S. National Phase under 35 U.S.C. § 371 of International Application No. PCT/EP2013/067159, filed on Aug. 16, 2013, which claims the benefit of EP12182654.9, filed on Aug. 31, 2012. The entire contents of these applications are incorporated by reference herein.

BACKGROUND OF THE INVENTION

The invention relates to an apparatus for packaging dosed quantities of solid drug portions and to a method of operating such an apparatus.

It is advantageous to package dosed quantities of solid drug portions, such as tablets, capsules and pills, in bags, pouches or other types of packaging, wherein the solid drug portions in each bag are packed separately per ingestion. The bags are provided with user information, such as the day and time of day the medicines have to be taken. The bags for one particular user are usually attached to each other and supplied rolled up in a dispenser box.

The filling of individual packages with dosed quantities of solid drug portions (batches) is increasingly being automated. A known apparatus for dosing solid drug portions for final packaging in individual packages comprises a plurality of supply containers respectively provided with different types of medicine. After reading or entering a medicine prescription, the supply containers relevant to the prescription are opened in order to allow a dosed quantity of solid drug portions to drop into a central fall duct and further into a funnel positioned under the supply containers. At the bottom of the funnel the selectively released solid drug portions are received in a packaging, such as a bag, after which the packaging is closed. Providing the packaging with user information can be realized here prior to or following filling of the packaging. A known apparatus for packaging dosed quantities of solid drug portions, described in EP 1 433 457 A1, comprises a plurality of storage containers (called tablet cases comprising a drive base and a container) each storing a plurality of solid drug portions and having a dosing means (in the drive base) for dispensing dosed quantities of solid drug portions. Below an upper section of the apparatus containing the storage containers two collecting receptacles are formed (called shutters). Each shutter receives the solid drug portions from one half of the storage containers and outputs the drug portions to a hopper which passes the drug portions to a packaging station. Vertical chutes formed by gaps between two shelves of storage containers guide the solid drug portions dispensed by the dosing means of the storage containers to one of the two collecting receptacles.

The known apparatus does however have several drawbacks. A significant drawback of the known apparatus is that the filling frequency of the apparatus depends to a considerable extent on, and is limited by, the (longest) drop time of the dispensed solid drug portions in the vertical chutes, whereby the filling frequency of the known apparatus is limited and cannot be increased. However, owing to the permanently increasing demand for medicines there is a need in practice to provide more packages of a dosed quantity of solid drug portions per unit time.

Undisclosed Dutch patent application NL2007384 discloses an apparatus for packaging dosed quantities of solid drug portions, comprising a plurality of dosing stations for dispensing a dosed quantity of solid drug portions, a first endless conveying means for conveying along the dosing stations a plurality of fall tubes, wherein each fall tube is adapted to guide a dosed quantity of solid drug portions delivered by at least one dosing station, a second endless conveying means for conveying a plurality of collecting containers, wherein each collecting container is adapted to receive solid drug portions guided through a fall tube, at least one discharge and packaging station for discharging solid drug portions collected by each collecting means to a packaging, and for closing the packaging provided with the dosed quantity of solid drug portions.

The apparatus in accordance with NL2007384 has a very high throughput, i.e. a very high number of solid drug portions is guided by the fall tubes. Due to the vast number of solid drug portions guided though the fall tubes, the inner surfaces of the fall tubes are contaminated with the residues of the drug portions over time. These residues can be transported to the collecting receptacles and further into the bags for the user. To prevent such unwanted transport of residues, the fall tubes have to be cleaned on a regular basis. Before cleaning the fall tubes they have to be removed from the apparatus which is time-consuming and requires an undesirable machine shutdown. During maintenance/cleaning of a removed fall tube, the apparatus must remain deactivated, as the apparatus has no information which fall tube at which position on the first conveying means has been removed for maintenance.

It is therefore the object of the present invention to provide an apparatus for packaging dosed quantities of solid drug portions with enhanced operating reliability and a method for operating an apparatus accordingly.

This object is solved by apparatus for packaging dosed quantities of solid drug portions according to claim 1. The apparatus comprises a plurality of dosing stations for dispensing solid drug portions, each dosing station having an outlet, a plurality of collecting means (e.g. collecting containers or guiding ducts with associated collecting receptacles) for collecting dosed quantities of solid drug portions dispensed by the dosing stations and for forwarding the dosed quantities of solid drug portions to a packaging means, each collecting means comprising an identifier means (e.g. an imprint of a number or a code on the collecting means, a sticker with a barcode or a QR code, or a memory or transponder chip) with a unique collecting means identifier (i.e. a number, name or code), a conveying means (e.g. an endless conveyor belt) comprising a plurality of mounting means at mounting positions arranged in a chain extending along a path of movement of the conveying means, each collecting means being detachably mounted to one of the mounting means and moved by the conveying means along the dosing stations, control means (e.g. a control unit, a computer or a network of computing devices) for controlling the operation of the dosing stations, the conveying means and the packaging means, and input means (e.g. a keyboard or reading devices) coupled to a control means for inputting the collecting means identifier, the control means being configured so as to maintain a mapping (e.g. a table, a data base or data associated by pointers) between identifiers (e.g. running position numbers or mounting position codes) assigned to each mounting means or mounting position and the unique collecting means identifiers of the collecting means mounted to the mounting means.

Preferably, the mapping, i.e. the association between the mounting means identifiers and the unique collecting means identifiers, is maintained within a memory of the control means enabling the unambiguous allocation of a collecting means to a mounting means. The mapping is not limited to these identifiers and can contain further data depending on the application of the apparatus. For example, the mapping can include data about the operating time of a collecting means or its material.

The mapping can have the form of a simple table, assigning, via the unique identifiers, the collecting means to the mounting means on the conveying means. The mapping allows an unambiguous allocation of collecting means to mounting means, in other words, the control unit "knows" which collecting means is mounted to which mounting means.

In accordance with the invention, the collecting means are moved along the dosing stations, i.e. they are not stationary. However, the control means controls the drives driving the conveying means and thus the control means knows the positions of the mounting means within the apparatus. Due to the knowledge of the positioning of the mounting means, the link between the mounting means and the collecting means is essential, wherein this link is provided by the mapping.

The mapping can be created when assembling the apparatus or putting it in operation. Alternatively, the mapping can be created during operation (see below).

In case it is determined that a given fall tube is contaminated, the collecting means identifier is read out and the obtained collecting means identifier data is entered into the control means. As a result, the mapping is updated indicating that the collecting means is contaminated and should not be used for further collecting steps.

In the simplest case the collecting means identifier can be deleted, resulting in the mounting means being assigned to no collecting means identifier, which indicates to the control means not to use the collecting means at the corresponding mounting position. Alternatively, further data may be added to the mapping indicating that the collecting means should no longer be used. For example, a bit can be set indicating that the collecting means is contaminated and should not be used anymore.

In a preferred embodiment the conveying means comprises a marker (e.g. an optical mark, a mechanical member for actuating a switch or a proximity sensor, or a magnetic member for actuating a hall sensor) of a reference position that has a fixed relationship (e.g. a constant distance along the path of movement of the conveying means) to the mounting positions of the mounting means, the marker being moved together with the mounting means, wherein the control means is coupled to a stationary reference position sensor for detecting the marker moving along, wherein the identifier assigned to each mounting means or mounting position corresponds to or is a function of a distance of the mounting position from the reference position. A sensor (for example an optical sensor) can be arranged within the apparatus and the conveying means can include a corresponding optical tag, wherein the passing of the tag is detected by the sensor. Alternatively, the conveying means can include a manner of light barrier, wherein the interruption of the light beam is caused by some part of the conveying means and used to assess the positioning of the conveying means (and therefore the positioning of the mounting means and the collecting means) within the apparatus. As a further alternative, the positioning of the conveying means can be determined when assembling/calibrating the apparatus. To compensate for possible slippage of the conveying means it is preferable to determine the positioning on a regular basis using a kind of sensor. The provision of a reference position marker makes it possible to simply use fixed relative position numbers as identifiers of the mounting means or mounting positions.

In a preferred embodiment the mapping comprises status information associated to each collecting means identifiers, the status information indicating an operating status of the corresponding collecting means. Preferably, the status information indicate whether the corresponding collecting means can be used for collecting drug portions and/or whether the corresponding collecting means has to be cleaned. The operating status information can be used by the control means to control the dispensing and collecting process in an efficient manner. So it is possible to skip collecting means that are marked as prohibited or contaminated, i.e. to cause the dosing stations not to dispense solid drug portions into these collecting means while continuing to move these collecting means along the dosing stations.

In one embodiment the identifier means of the collecting means are machine-readable, and the input means comprise a reading means for reading the machine-readable identifier means. Preferably, the reading means is positioned in a fixed relationship to the conveying means so that the reading means can read the machine-readable identifier means of the collecting means mounted to the mounting means, when the mounting means are moved along the path of movement. This embodiment allows for an automatic learning process for creating the mapping to be stored in the control means. The conveying means is moved until the reference position marker activates the stationary reference position sensor. Then the control means knows the current position of the conveying means and its mounting positions. The control means then causes the reading means to read the unique collecting means identifier positioned at the reading means, wherein the control means knows which mounting means is positioned at the reading means, so that the read collecting means identifier can be associated to the identifier (e.g. position number) of that mounting means. Then, the control means stores this pair of identifiers into its mapping and causes the conveying means to advance until the next identifier means with the next unique collecting means identifier can be read. This step is repeated, until all collecting means identifiers are read and the mapping is complete.

In a preferred embodiment the dosing stations are arranged in a plurality of parallel columns, each column comprising a plurality of dosing stations, wherein each collecting means comprises a guiding duct and an associated collecting receptacle, the guiding ducts being arranged to guide the solid drug portions from the outlets of the dosing stations to the associated collecting receptacles. This makes it possible to dispense multiple solid drug portions simultaneously into the same collecting means in a pipelined manner. A dosing station can output a next drug portion into a next collecting means while the previously output drug portion of the same dosing station is still guided (e.g. falling) in the guiding duct (e.g. fall tube) of the previous collecting means. Thus the dosing station does not have to wait, until the drug portion has fallen down to the bottom and reached the collecting receptacle. This leads to a higher filling rate and a higher throughput of the apparatus.

In a further preferred embodiment the guiding duct and the associated collecting receptacle of a collecting means are separate and can be decoupled so that the collecting receptacle can be moved away from the guiding duct and subsequently coupled with another guiding duct. Preferably, the conveying means comprises a first endless conveyor and a second endless conveyor, the guiding ducts being coupled to fixed mounting positions of the first endless conveyor and the collecting receptacles being coupled to fixed mounting positions of the second endless conveyor. Physically separating the collecting receptacles from the guiding ducts makes it possible to guide the collecting receptacles away from the guiding ducts, which can not only be advantageous at the discharge and packaging station of the apparatus, but particularly also because this makes it possible to guide the collecting receptacles along one or more other types of (special) dosing stations for direct dispensing of drug portions to the collecting receptacles, not via the guiding ducts.

In one embodiment the apparatus further comprises a cleaning device for cleaning the collecting means. The cleaning device can be positioned so that each collecting means is moved by the conveying means along the cleaning device. The cleaning device can be coupled to the control means. The control means can activate the cleaning device, if a collecting means which is marked as contaminated is positioned at the cleaning device.

The object of the invention is also solved by a method for operating an apparatus for packaging dosed quantities of solid drug portions, said apparatus comprising a plurality of dosing stations for dispensing solid drug portions, a plurality of collecting means for collecting dosed quantities of solid drug portions dispensed by the dosing stations and forwarding the dosed quantities of solid drug portions to a packaging means, a conveying means for conveying the collecting means comprising a plurality of mounting positions each for receiving one collecting means, the mounting positions arranged in a chain extending along a path of movement of the conveying means, control means for controlling the operation of the dosing stations, the conveying means and the packaging means, and a reading means coupled to the control means, the method comprising:

a) assigning a unique collecting means identifier to each collecting means and attaching an identifier means comprising the assigned collecting means identifier to each collecting means, b) detachably mounting each collecting means to the conveying means at one of the mounting positions, and successively reading the collecting means identifier of each mounted collecting means by the reading means, and associating the read collecting means identifier to an identifier of the corresponding mounting position, c) maintaining a mapping of the collecting means identifiers and the associated identifiers of the corresponding mounting positions, and d) conveying the collecting means along the dosing stations, so that the collecting means can receive the solid drug portions dispensed by the dosing stations, collecting solid drug portions by the collecting means and forwarding the collected solid drug portions to a packaging means.

In a preferred embodiment of this method, in step b), the collecting means identifier of each mounted collecting means are read by successively moving all collecting means along the reading means after all collecting means have been mounted to the conveying means, wherein the identifiers of the corresponding mounting positions are associated by assigning a start position to a first one of the collecting means positioned at the reading means and associating running position numbers of the mounting positions that are subsequently positioned at the reading means.

In a preferred embodiment step d) comprises: observing, for each collecting means, the numbers of solid drug portions collected and forwarded by that collecting means, and associating, to each collecting means identifier, a parameter indicating a degree of contamination, the parameter depending on the amount of solid drug portions collected and forwarded by that collecting means. Preferably, a collecting means is excluded from further collecting and forwarding of solid drug portions, if the parameter indicating a degree of contamination exceeds a predetermined threshold value. In another embodiment an cleaning required indication is associated to the collecting means identifier, if the parameter indicating a degree of contamination exceeds a predetermined threshold value. The contamination level of a collecting means can be determined on the basis of the operating time of a collecting means, wherein this determination is performed by the control means on the basis of additional data stored in the mapping. The operating time of the collecting means can depend on their characteristics (such as material, coating of the inner surface) or the kind of drug portions guided through the collecting means. Alternatively or additionally, the contamination level of a collecting means can be determined with a sensor assigned to a collecting means. A sensor (or at least a part of the sensor) can be arranged within each collecting means, or one sensor can determine the level of contamination of each passing collecting means provided the collecting means are adapted accordingly (for example with a detection opening or the like). The sensor is coupled to the control means, and based on the mapping the control means can determine which collecting means passes the sensor.

In one embodiment the collecting means is cleaned, if the parameter indicating a degree of contamination exceeds a predetermined threshold value, and the corresponding parameter indicating a degree of contamination is reset after cleaning. The collecting means can be detached from the mounting position, then cleaned external to the apparatus, and mounted again to the conveying means at one of the mounting positions, wherein the collecting means identifier is read by the reading means, and associated to the identifier of the corresponding mounting position.

In one embodiment the collecting means can be detached from the mounting position, after the conveying means has moved the collecting means to a demounting place, and wherein the collecting means can be mounted again to the conveying means at one of the mounting positions, after the conveying means has moved that mounting position to a mounting place.

A collecting means may be removed for maintenance immediately upon determination of its contamination. Alternatively, the contaminated collecting means may be removed during a scheduled shutdown of the apparatus. After maintenance (cleaning in most cases) of the contaminated collecting means, it has to be re-inserted in the apparatus. Alternatively, another or a new collecting means is inserted.

Before (or after) inserting the cleaned or new collecting means, its unique identifier is read out and the identifier data is entered via the input means into the control means and the mapping is updated accordingly (depending on the amendment to the mapping upon tagging a mounting means as to be excluded from further collecting steps), either by assigning the identifier data to the unassigned mounting means or by amending the mapping indicating that the mounting means/the collecting means can be used again.

In case a number of collecting means are contaminated during normal operating time, the procedure as described can be applied, provided that the collecting means are maintained separately, i.e. only one collecting means is removed/maintained at a given time.

The method may contain the additional steps of detaching the contaminated collecting means for maintenance purposes, and reading out the collecting means identifier, entering the collecting means identifier data into the control means and tagging the mounting means the collecting means was coupled to as being empty (using the mapping maintained within the memory of the control means). By doing so it is ensured that the control unit keeps track of the occupied and the empty mounting means enabling proper installation of new and/or maintained collecting means.

To ensure proper installation of new and/or maintained collecting means, the method may comprise the further steps of installing the collecting means at a mounting means and reading out the collecting means identifier, entering the collecting means identifier data into the control means and tagging the mounting position/the collecting means as to be included for further collecting steps. In case a plurality of mounting means for a plurality of collecting means are empty when a collecting means is inserted, additional data is required to identify the mounting means the collecting means was coupled to/should be coupled to. These additional data can be entered by the operator or provided by a sensor assigned to the mounting means to which the fall tube was coupled.

The apparatus may comprise a maintenance device arranged around a part of the chain of collecting means. In this case the method may comprise the additional step of passing each collecting means through the maintenance device. In the case that the maintenance device is not arranged around a part of the chain of collecting means, the method may comprises the further steps of removing the contaminated collecting means from the corresponding mounting means and moving it to the maintenance device, and, upon completion of maintenance, moving the collecting means to an empty mounting means and coupling it to the mounting means. As this kind of maintenance/cleaning process is automated, a sensor should be assigned to each mounting means, allowing the control means to monitor which collecting means is removed from which mounting means.

BRIEF DESCRIPTION OF THE DRAWINGS

The invention will be described on the basis of non-limitative exemplary embodiments shown in the following figures. Herein.

DETAILED DESCRIPTION

Figure 1:
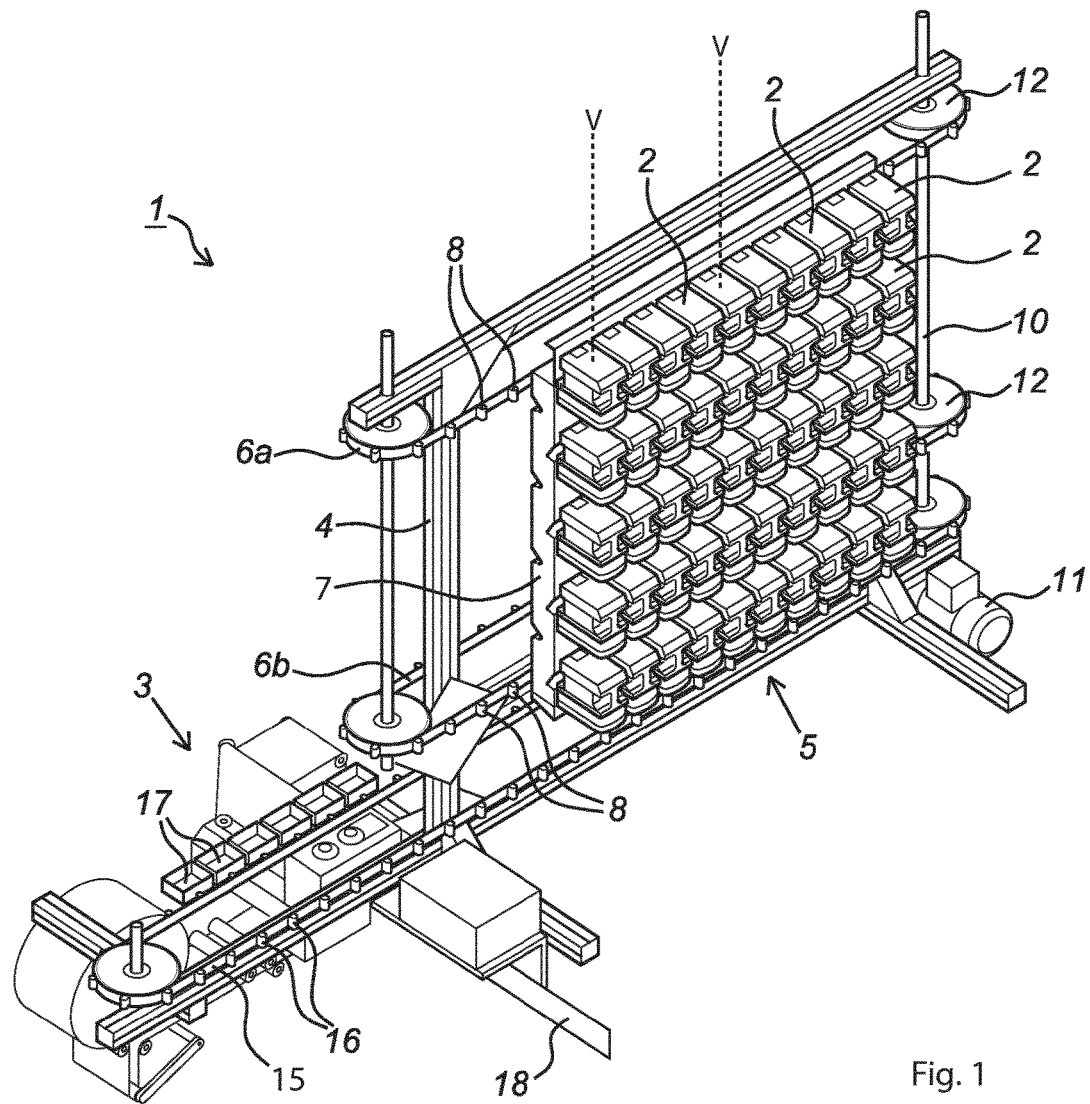
FIG. 1 is a first perspective view of an apparatus according to the invention for transporting dosed quantities of solid drug portions from a plurality of dosing stations to a packaging station.
Figure 2:
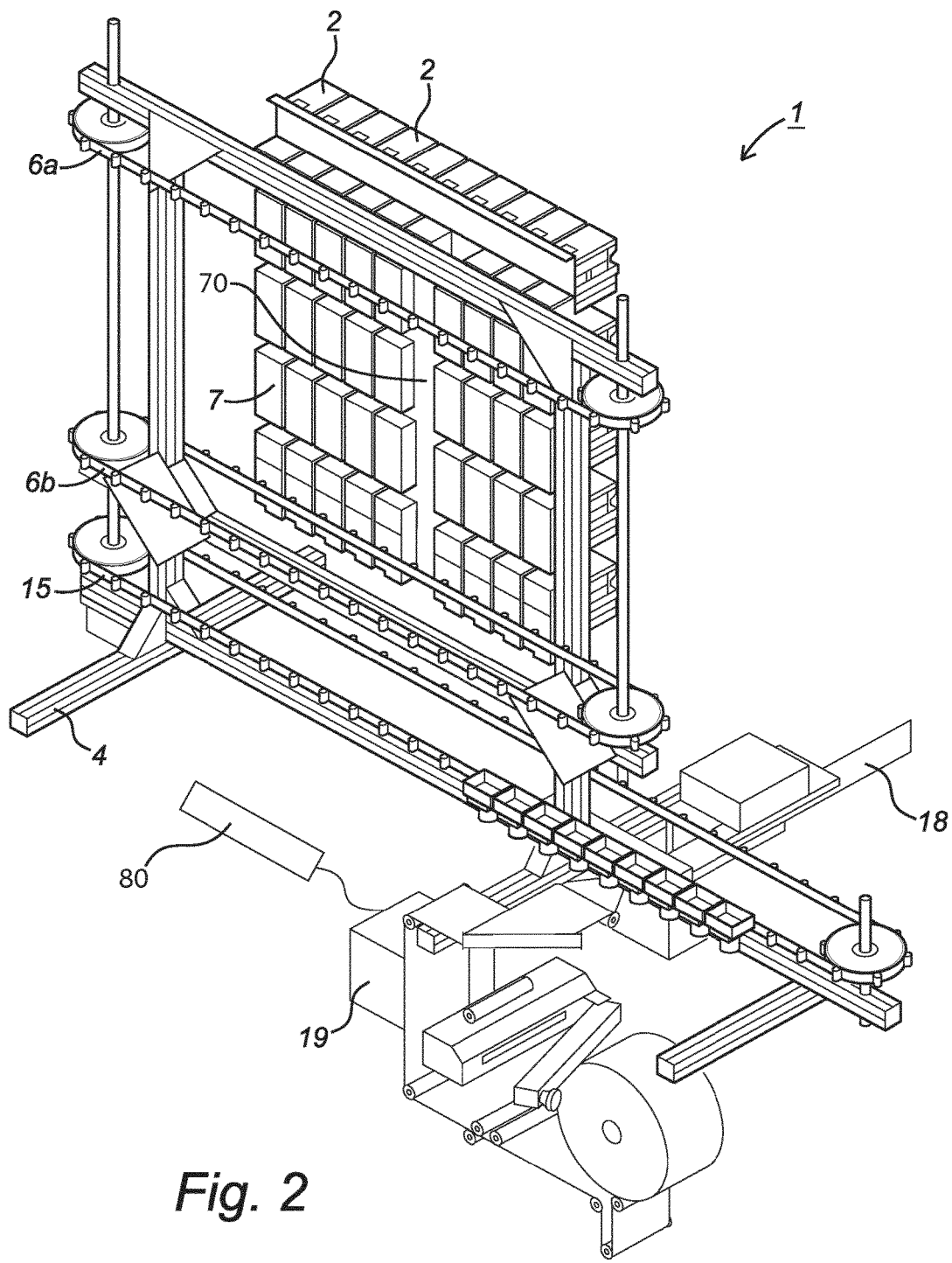
FIG. 2 is a second perspective view of the apparatus according to FIG. 1.
Figure 3:
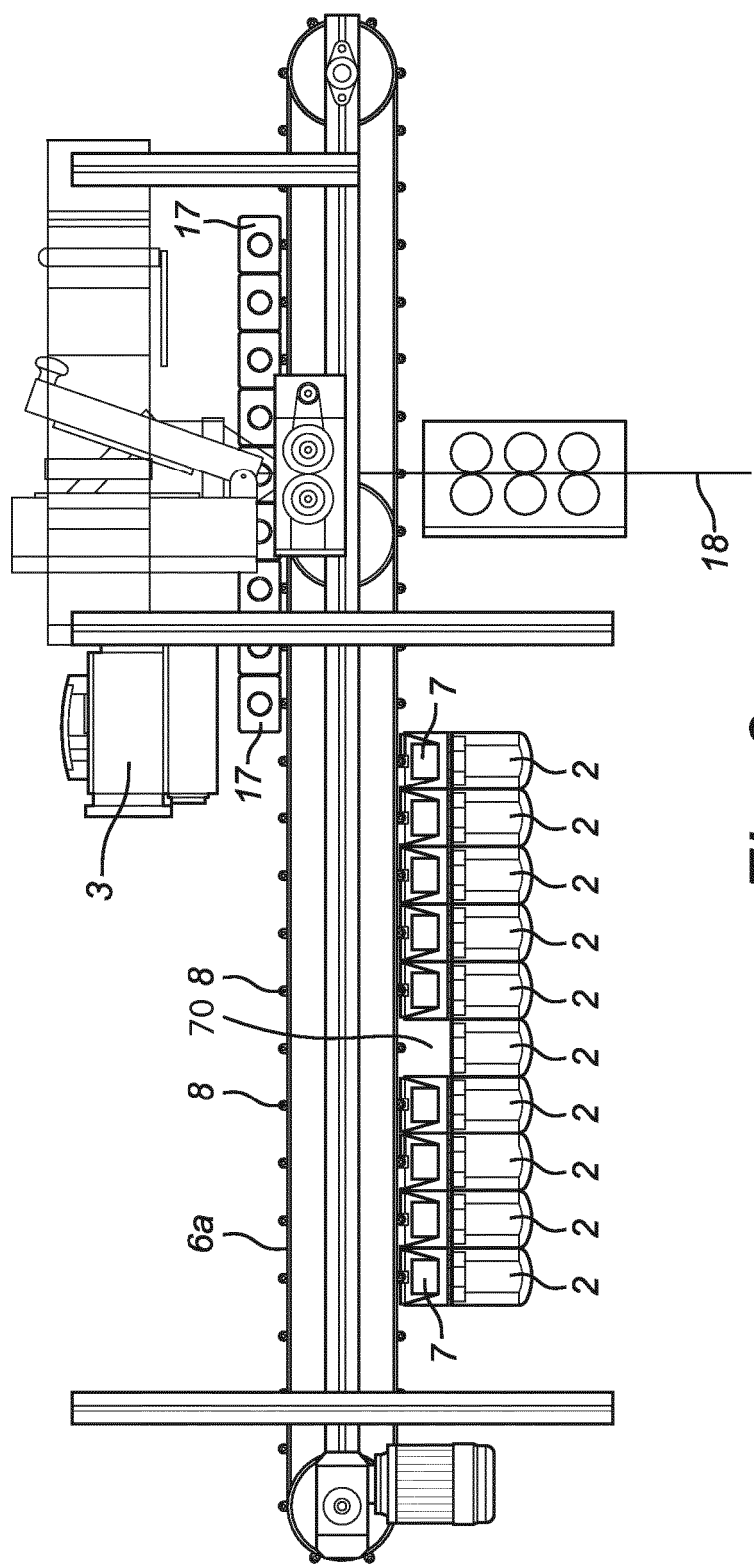
FIG. 3 is a bottom view of the apparatus according to FIG. 1.
Figure 4:
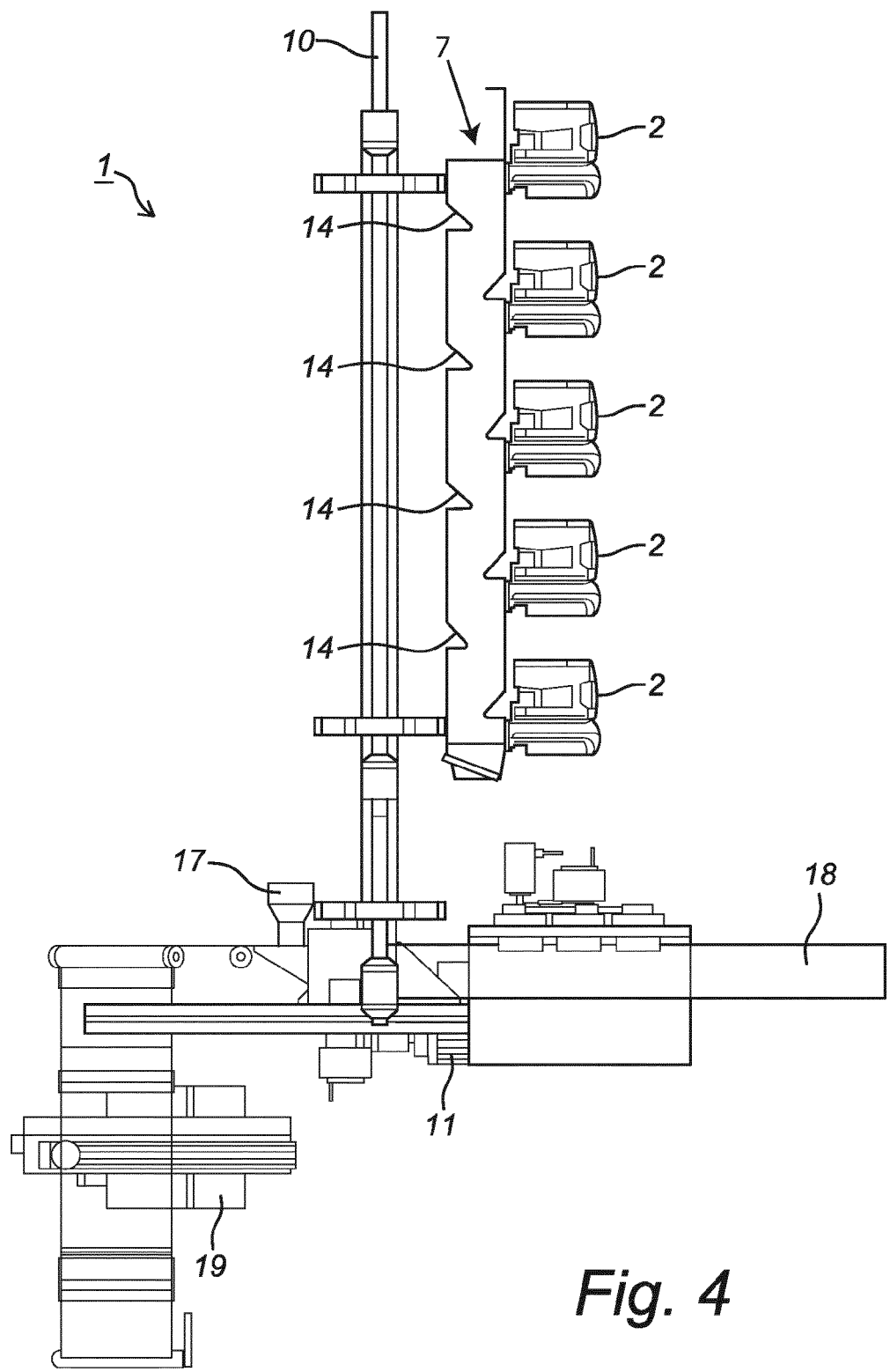
FIG. 4 is a side view of the apparatus according to FIG. 1.

FIGS. 1 and 2 show different perspective views, FIG. 3 shows a bottom view and FIG. 4 shows a side view of an apparatus 1 according to the invention. Apparatus 1 comprises a support structure 4 (frame) to which a plurality of dosing stations 2 is connected in stationary, detachable manner. Each dosing station 2 is adapted to hold a supply of one type of solid drug portions. Different dosing stations 2 will generally hold a supply of different types of solid drug portions, although it is also possible that frequently-dosed solid drug portions are held by a plurality of dosing stations 2. The majority of the number of applied dosing stations 2 are arranged in two matrix structures 5 (of which only a single matrix structure is shown in the figure), which matrix structures 5 together enclose a part of a first conveyor, wherein this first conveyor is provided by two horizontally running conveyor belts 6a, 6b for fall tubes 7. The fall tubes 7 are mounted detachably on mounting means 8 forming part of both conveyor belts 6a, 6b. Furthermore, a (not shown) sensor may be assigned to the conveyor for detecting whether a fall tube is mounted to a given mounting means.

In the shown embodiment only a few fall tubes 7 are shown, although in practice each mounting means 8 will generally be connected to a fall tube 7, whereby the conveyor belts 6a, 6b are provided all the way round with fall tubes 7.

The conveyor belts 6a, 6b are driven by drive wheels 9 which are coupled by means of a vertical shaft 10 to an electric motor 11. In order to be able to counter slippage of conveyor belts 6a, 6b the running surfaces 12 of the drive wheels take a profiled form. Through driving of the conveyor belts 6a, 6b the fall tubes 7 can be guided along the dosing stations 2 arranged in matrix structures 5 for the purpose of receiving dosed quantities of solid drug portions dispensed by dosing stations 2.

In the shown embodiment each fall tube 7 is adapted for simultaneous co-action with a plurality of dosing stations 2 positioned above each other. Each fall tube is provided with a number of input openings 13 (see FIG. 12) corresponding to the number of dosing stations 2 with which fall tube 7 will simultaneously co-act. The fall tubes 7 are also provided with several constrictions 14 (see FIG. 4) for limiting the maximum length of the free fall of falling solid drug portions, in order to limit the falling speed, and thereby limit damage to the falling solid drug portions. Use is generally made here of a maximum free-fall length of 20 cm. The constrictions 14 also guide falling solid drug portions away from the input openings 13 of a fall tube (and therefore from the outlets of the dosing stations) to prevent falling solid drug portions from entering an output opening of a dosing station and sticking there.

Figure 12:
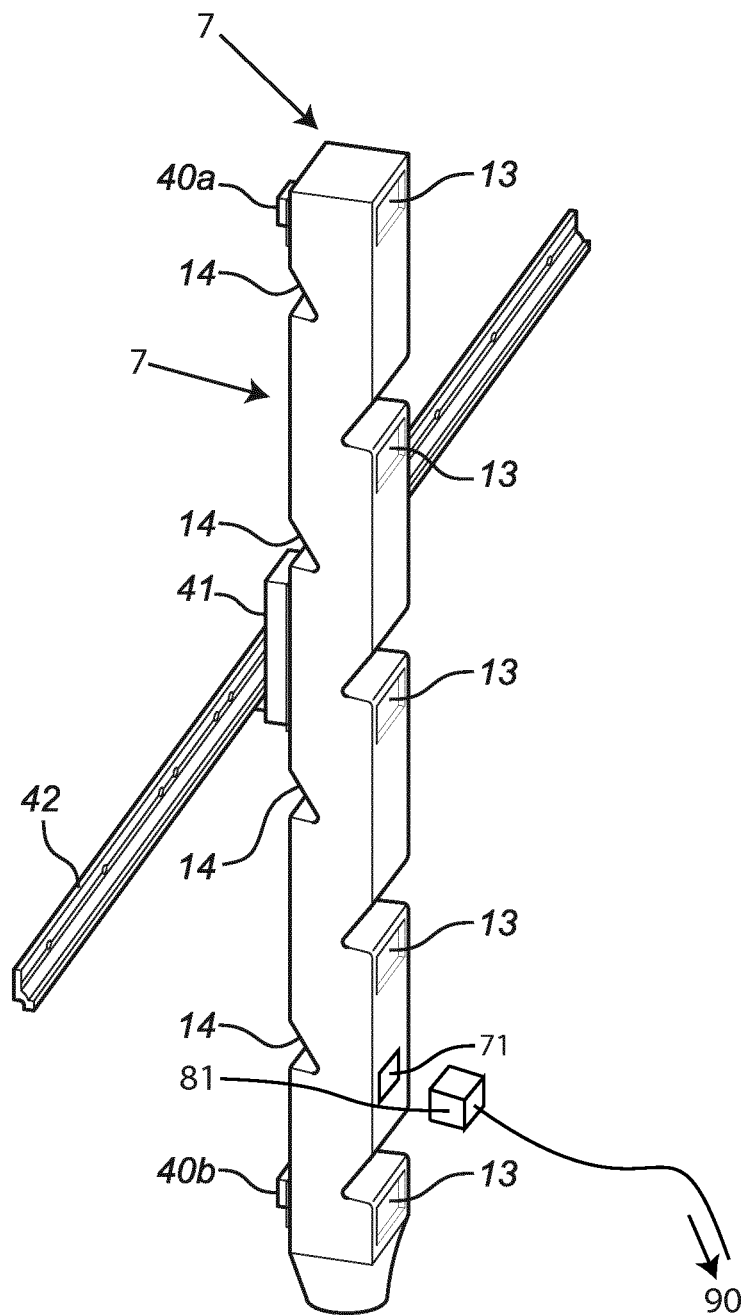
FIG. 12 shows a fall tube as applied in the apparatus according to FIGS. 1-4.

As can be seen from FIG. 3, one fall tube 70 in the chain of fall tubes is missing; this fall tube has been removed for maintenance and the association (mapping) within the control unit 19 has been updated accordingly by entering the fall tube identifier data via the input means 80 (see FIG. 2) or the identification means 81 (see FIG. 12). Due to the perspective view of FIG. 4, the fall tube identifiers cannot be seen in FIG. 3 (see FIGS. 12 and 13). The apparatus 1 also comprises a conveyor belt 15 provided with mounting means 16 on which a plurality of collecting receptacles (or collecting containers) 17 are detachably mounted. Each mounting means 16 will generally be provided here with a collecting receptacle 17 adapted for temporary storage of a dosed quantity of solid drug portions made up in accordance with a prescription. Not all collecting receptacles 17 are shown in the figures.

The conveyor belt 15 is coupled mechanically to the conveyor belts 6a, 6b and is also driven by electric motor 11, wherein the direction and the speed of the movement of conveyor belts 6a, 6b, 15 are the same. It is moreover advantageous for the conveyor belts 6a, 6b and the conveyor belt 15 to be mutually aligned, wherein mounting means 8, 16 lie in a substantially vertical line (directly under each other). The distance between adjacent mounting means 8, 16 amounts to 80 mm, this substantially corresponding to the width of collecting receptacles 17, fall tubes 7 and dosing stations 2. Collecting receptacles 17 are adapted to receive solid drug portions falling through fall tubes 7. Each fall tube 7 is provided for this purpose with a passage opening for falling solid drug portions on the underside. For a part of the transport route each collecting receptacles 17 will be positioned here directly under a fall tube 7. In order to be able to prevent as far as possible sagging of conveyor belts 6a, 6b, 15 due to the weight of fall tubes 7 and collecting receptacles 17, respectively, conveyor belts 6a, 6b are tensioned under a bias of about 600 N. Conveyor belts 6a, 6b, 15 are generally manufactured from a relatively strong plastic such as nylon. As shown in the figures, conveyor belt 15 is longer than each of the conveyor belts 6a, 6b. The advantage hereof is that collecting receptacles 17 can be transported further along and/or under one or more special dosing stations (not shown), preferably formed by preferential drawers, provided with special—less frequently administered solid drug portions, which special dosing stations 2 are adapted for direct delivery of selected solid drug portions to collecting receptacles 17, so not via fall tubes 7. Collecting receptacles 17 will then be guided in the direction of the discharge and packaging station 3 where the solid drug portions collected in accordance with prescription are removed from collecting receptacles 17, wherein the solid drug portions are transferred to an opened foil packaging 18. In packaging station 3 the foil packaging 18 will be successively sealed and provided with specific (user) information. The overall control of apparatus 1 is realized by applying a control unit 19.

Figure 5:
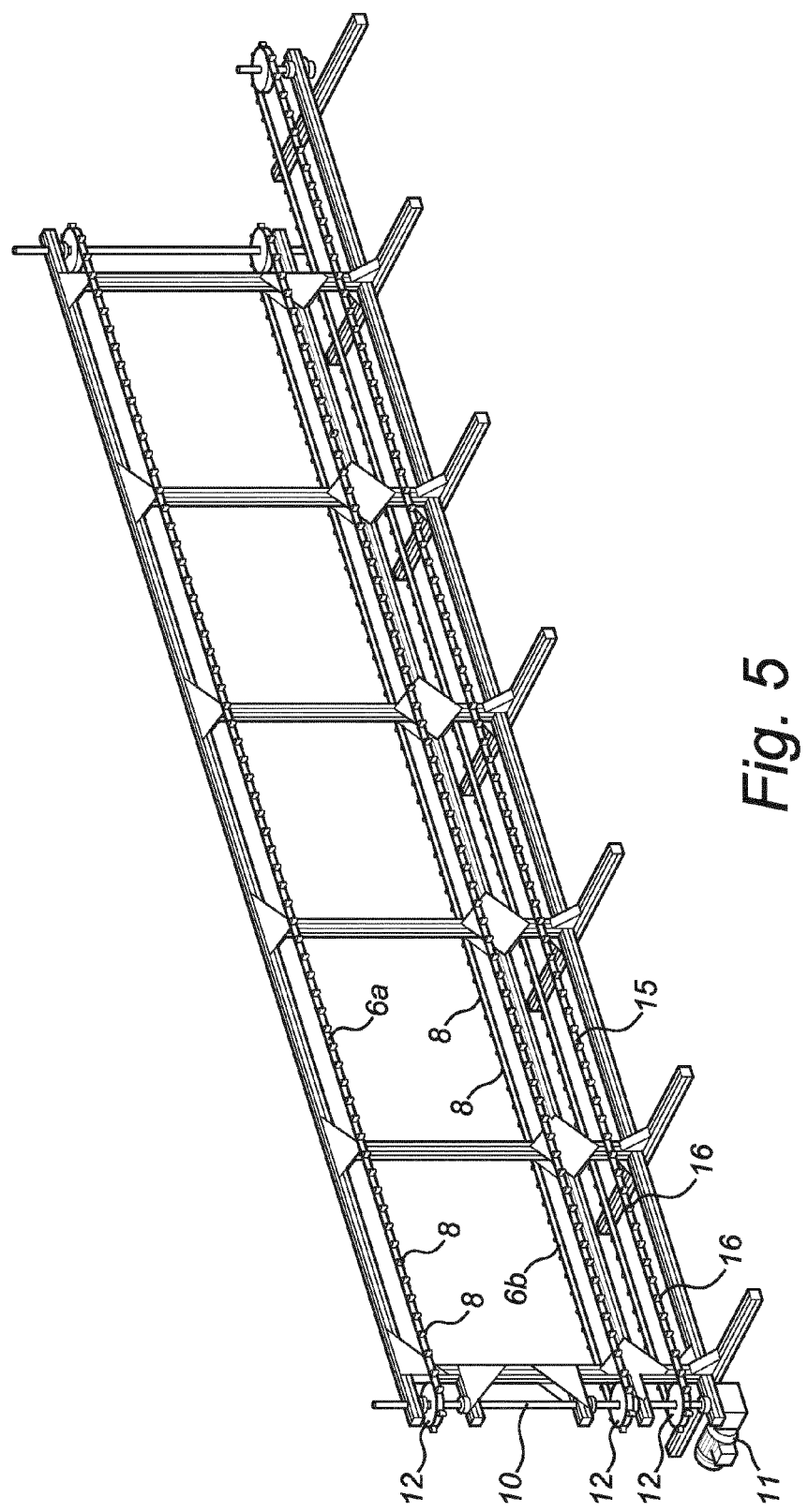
FIG. 5 is a perspective view of the apparatus 1 as shown in FIGS. 1-4.

FIG. 5 is a perspective view of support structure 4 provided with conveyor belts 6a, 6b, 15 of apparatus 1 as shown in FIGS. 1-4, this in fact forming the heart of the apparatus 1 on which fall tubes 7 and collecting receptacles 17 are mounted and around which dosing stations 2 are then positioned on both longitudinal sides of support structure 4.

Figure 6:
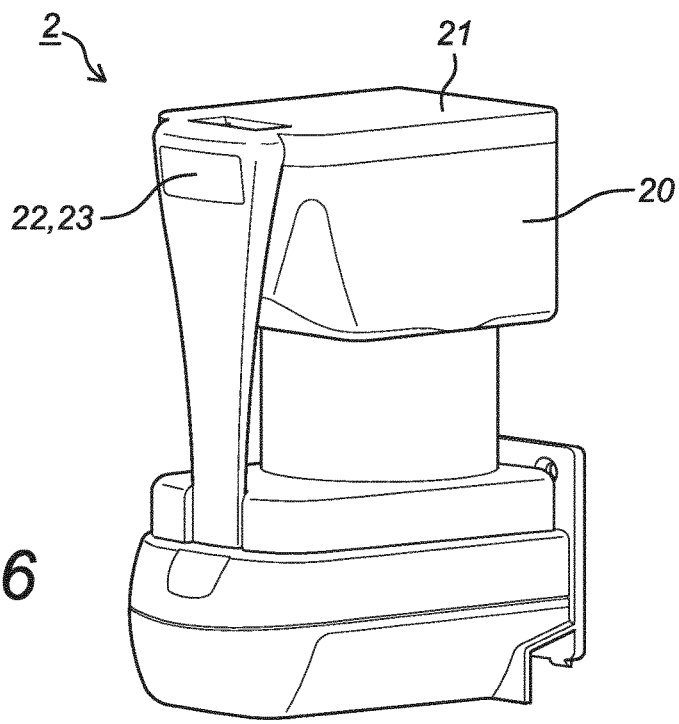
FIG. 6 is a perspective rear view of a dosing station for use in a apparatus as shown in FIGS. 1-4.
Figure 7:
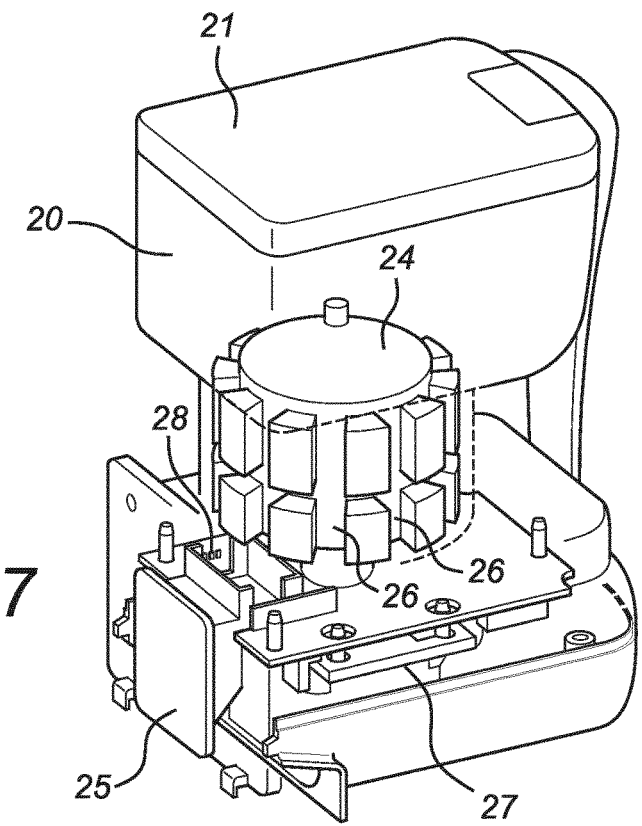
FIG. 7 is a perspective front view of the dosing station as shown in FIG. 6.

FIG. 6 is a perspective rear view of a dosing station 2 for use in an apparatus 1 as shown in FIGS. 1-4. Dosing station 2 is also referred to as a canister, formed by a unit which can be coupled detachably to support structure 4 and which comprises a housing 20 and a cover 21 closing the housing 20. The housing is preferably manufactured at least partially from a transparent material so that the degree of filling of dosing station 2 can be determined without opening dosing station 2. An outer side of housing 20 is provided with a receiving space 22 for a tablet or pill corresponding to tablets or pills held in the housing. Receiving space 22 is covered by means of a transparent cover element 23. A person can hereby see immediately with which tablets or pills the dosing station 2 has to be filled. In the perspective front view of dosing station 2 as shown in FIG. 7 the housing 20 is shown partially transparently in order to make visible the inner mechanism of dosing station 2. Accommodated as shown in housing 20 is an axially rotatable individualizing wheel 24 which is detachably connected to housing 20 and which is adapted during axial rotation to separate a single tablet or single pill which can subsequently be removed from housing 20 via a fall guide 25 arranged in the housing and can be transferred to a passage opening 13 of a fall tube 7 connecting onto fall guide 25. Individualizing wheel 24 is provided here with a plurality of receiving spaces 26 for pills or tablets distributed over the edge periphery. The size of receiving spaces 26 can generally be adapted to the size of the pills or tablets to be held in supply. Individualizing wheel 24 can be rotated axially by means of an electric motor 27 also accommodated in housing 20. Arranged in fall guide 25 is a sensor 28 which can detect the moment at which a pill or tablet for separation falls, and thereby also whether housing 20 has been emptied. Dosing stations 2 are visible from an outer side of apparatus 1 and accessible for possible replenishment of dosing stations 2. Housing 20 will generally be provided with multiple LEDs (not shown) to enable indication of the current status of dosing station 2, and particularly in the case that dosing station 2 has to be replenished or is functioning incorrectly.

Figure 8:
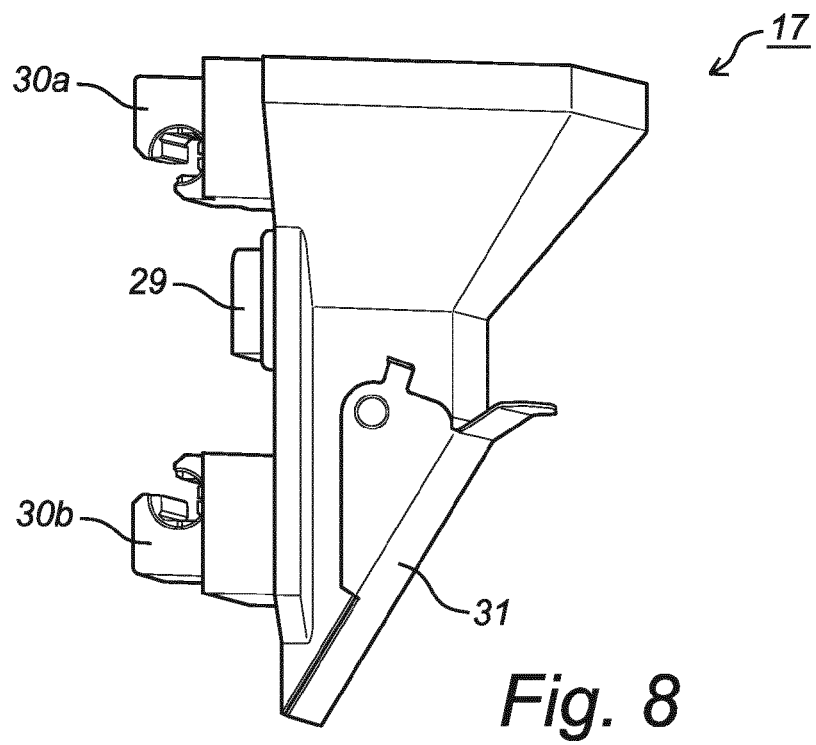
FIG. 8 is a perspective view of a collecting receptacle for use in an apparatus 1 as shown in FIGS. 1-4.
Figure 9:
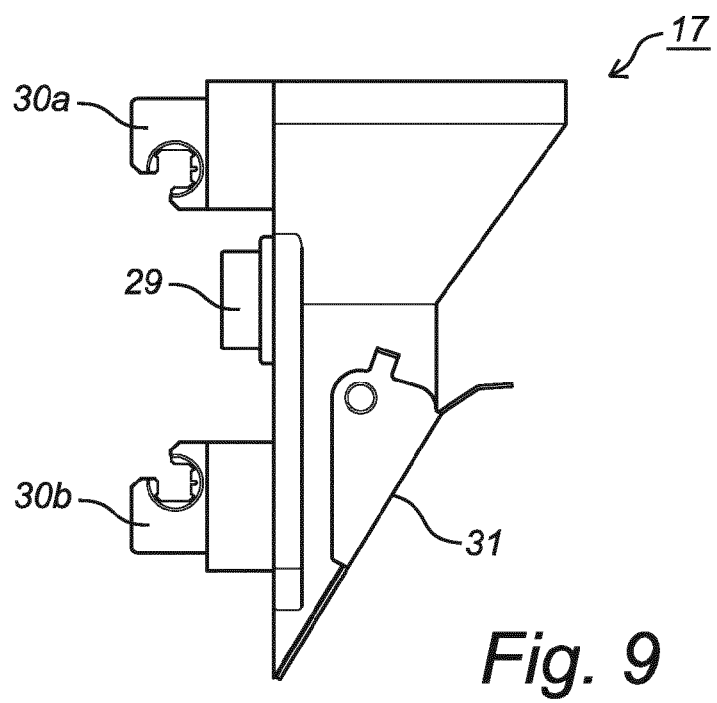
FIG. 9 is a side view of the collecting receptacle according to FIG. 8.

FIG. 8 is a perspective view and FIG. 9 is a side view of a collecting receptacle 17 for use in apparatus 1 as shown in FIGS. 1-4. Collecting receptacle 17 comprises here a mating mounting element 29 for co-action with mounting means 16 of conveyor belt 15. In order to increase the stability of collecting receptacles 17, the collecting receptacle 17 also comprises two securing gutters 30a, 30b for clamping or at least engaging round the conveyor belt 15. An upper side of collecting receptacle 17 takes an opened form and has a funnel-like shape so that it can receive drug portions falling out of a fall tube 7. An underside of collecting receptacle 17 is provided with a pivotable closing element 31 provided with an operating tongue via which the closing element 31 can be pivoted to enable opening, and thereby unloading, of collecting receptacle 17. Collecting receptacle 17 will generally be provided with a biasing element (not shown), such as a compression spring, in order to urge closing element 31 in the direction of the position closing the collecting receptacle 17, whereby erroneous opening of collecting receptacle 17 can be prevented.

Figure 10:
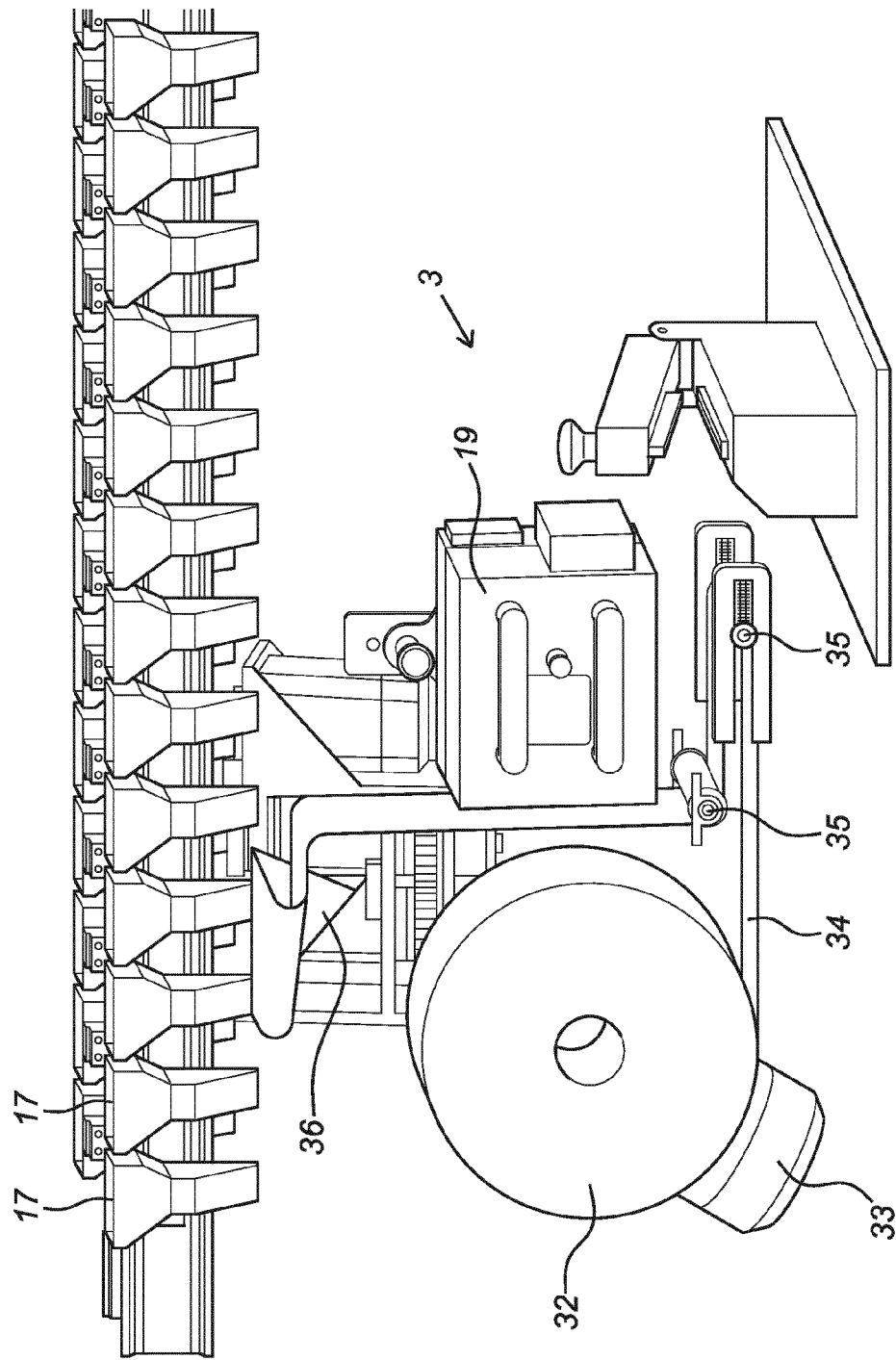
FIG. 10 is a perspective front view of the discharge and packaging station as applied in the apparatus as shown in FIGS. 1-4.
Figure 11:
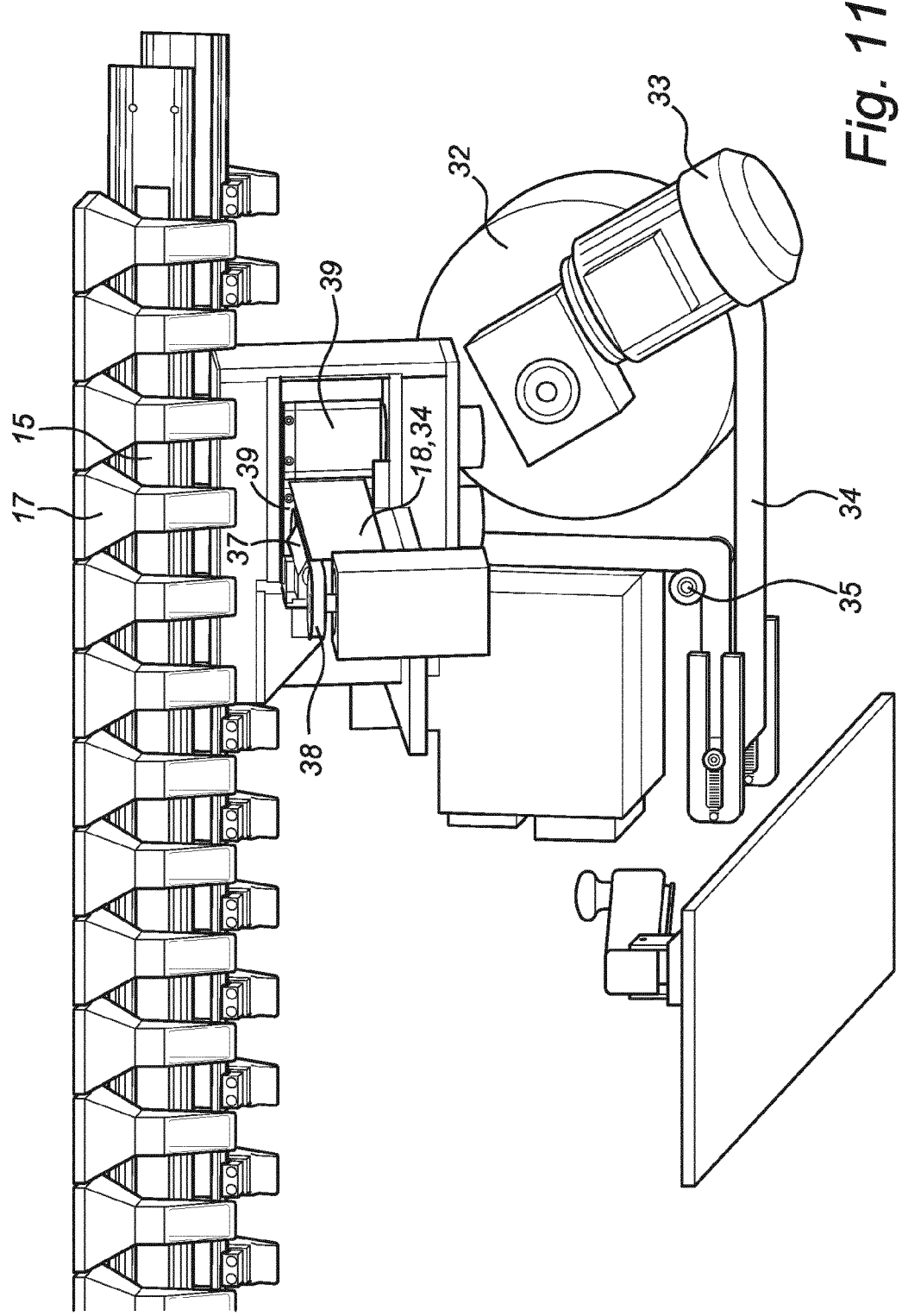
FIG. 11 is a perspective rear view of the discharge and packaging station according to FIG. 10.

FIGS. 10 and 11 show a perspective front view and perspective rear view of the discharge and packaging station 3 as applied in apparatus 1 as shown in FIGS. 1-4. Packaging station 3 comprises a foil roll 32 which can be unwound by means of an electric motor 33, after which the unwound foil 34 is guided via a plurality of guide rollers 35 in the direction of the collecting receptacle 17 to be emptied. The transport direction of foil 34 is indicated by means of arrows in both FIGS. 10 and 11. Before foil 34 is transported below a collecting receptacle 17 for emptying, foil 34 is provided with a longitudinal fold, whereby a V-shaped fold 36 is created in which the medicines can be received following opening of collecting receptacle 17. Foil 34 can be provided with two transverse seals and a longitudinal seal to enable complete sealing of packaging 18. Applied in making the longitudinal seal are two heat bars 37, of which only one heat bar 37 is shown, and which press on either side of the two foil parts to be attached to each other, whereby the foil parts fuse together and the longitudinal seal is formed. It is advantageous here for each heat bar 37 to engage foil 34 via a stationary strip manufactured from plastic, in particular Teflon, or displaceable band 38 in order to prevent adhesion of heat bars 37 to the foil. The transverse seals are also created by two upright rotatable heat bars 39 which co-act with each other and press the foil parts against each other in realizing a transverse seal. Packaging 18 can optionally be further provided with a label. Successive packages 18 remain mutually connected in the first instance and together form a packaging strip.

FIG. 12 shows a fall tube 7 being provided with two mating mounting elements 40a, 40b for co-action with mounting means 8 of conveying means 6a, 6b. A particular feature however of the fall tube 7 shown in FIG. 12 is that the fall tube 7 is provided with a unique identifier 71. This identifier 71 can be a simple number. Alternatively, the identifier can be provided by a bar code or an RFID tag. The kind of identifier provided is not essential for the present invention, it however influences the kind of read-out means/identifications means used to read out the fall tube identifier data. Essential, however, is the association of the fall tubes with the mounting means.

Figure 13:
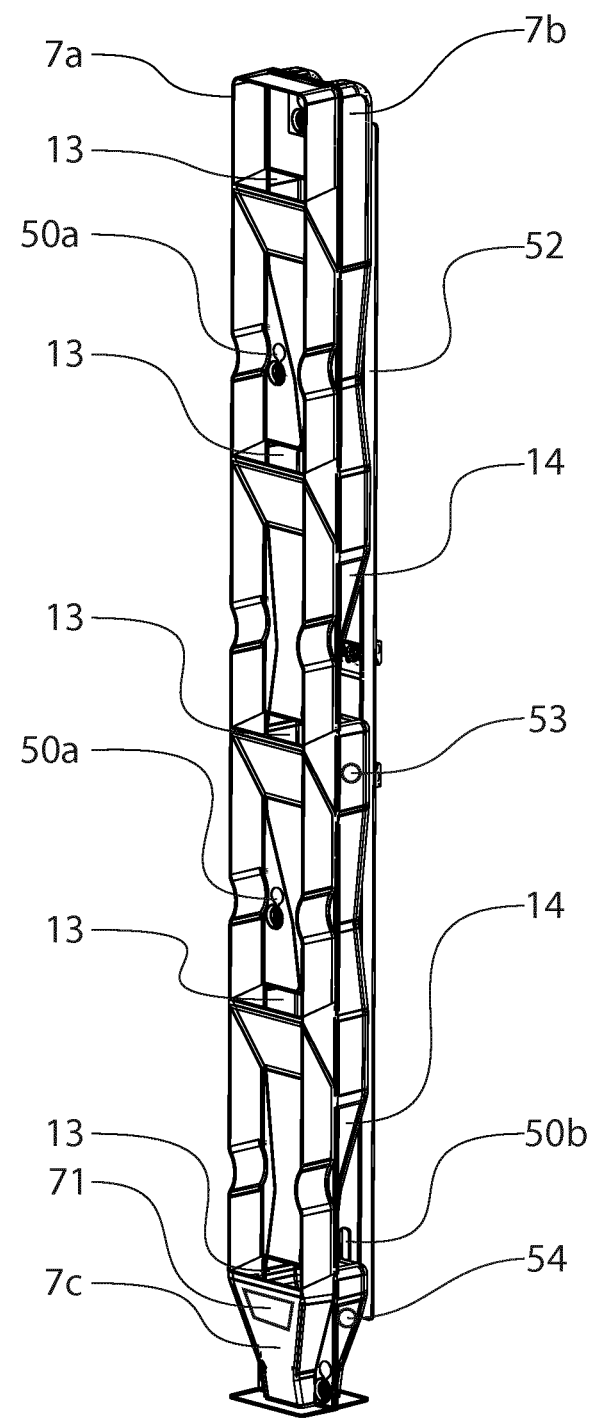
FIG. 13 shows a side view of an embodiment of a fall tube as applied in the apparatus.

FIG. 13 shows a view of an embodiment of a fall tube. As mentioned above, a fall tube may comprises at least two parts and in the shown embodiment the at least two parts are provided as base part 7b and front part 7a. In this embodiment, the base part 7b is detachably connected to a mounting beam 52 which is detachably connected to a (not shown) conveyor belt. The front part 7a comprises the unique fall tube identifier and a plurality of input openings 13 which have a kind of funnel shape. The (not shown) dosing stations release a dosed quantity of solid drug portions which leaves the dosing station via the output opening and enters the front part 7a of a fall tube 7 via an input opening 13. The shape/configuration of the input opening is not essential as long as it is ensured that any kind of drug portion can pass through it. For example, the input openings can be formed as simple openings in the front part as it is implied in FIG. 12.

The front part 7a of the shown fall tube is detachably connected to the base part 7b of the fall tube 7. In the shown embodiment the front part 7a comprises a number of retainer means 50a and the base part 7b comprises a number of mating openings 50b which have a shape of a long hole in the shown embodiment. The front part 7a is also secured by a latching element 50c located at the upper part of the fall tube.

To detach the front part 7a, the latching element is released and the front part is raised and drawn away from the base part 7b. To assemble the fall tube (for example after both parts have been cleaned) the procedure is performed in reverse.

The base part 7b of the fall tube 7 comprises a number of constrictions 14 which limit the falling speed of the solid drug portions and prevent falling drug portions from entering an output opening of a dosing station by guiding the falling medicine away from the input openings of the front part/the output openings of the dosing stations.

In the shown embodiment the base part 7b of a fall tube comprises two sensors 53, 54. Sensor 54 is arranged at the lower section of the base part 7a and is arranged to monitor the number of falling drug portions. The sensor is coupled with the (not shown) control unit, and the control unit may, depending on the number of drug portions that have passed the sensor 54, initiate maintenance of the fall tube in which the sensor is arranged.

The sensor 53 is arranged somewhere within the base part 7b of a fall tube and is adapted to monitor the contamination of the inner surface of the base part. As soon as such contamination exceeds a predetermined limit, the control unit, to which the sensor 53 is also coupled, may initiate maintenance.

It will be apparent that the invention is not limited to the exemplary embodiments shown and described here, but that numerous variants which will be self-evident to the skilled person in this field are possible within the scope of the appended claims.

What is claimed is:

1. An apparatus for packaging dosed quantities of solid drug portions, comprising:
    a plurality of dosing stations for dispensing solid drug portions, each dosing station having an outlet;
    a plurality of collectors configured to collect dosed quantities of solid drug portions dispensed by the dosing stations and to forward the dosed quantities of solid drug portions to a packaging station, each collector comprising a guiding duct, an associated collecting receptacle, and a unique collector identifier;
    at least one first conveyor belt comprising a plurality of first mounting elements at first mounting positions arranged in a chain extending along a first path of movement of the at least one first conveyor belt, each guiding duct being detachably mounted to one of the first mounting elements and moved by the at least one first conveyor belt along the dosing stations;
    a second conveyor belt comprising a plurality of second mounting elements at second mounting positions arranged in a chain extending along a second path of movement of the second conveyor belt, each collecting receptacle being detachably mounted to one of the second mounting elements and moved by the second conveyor belt beneath the guiding ducts,
    wherein the collector can receive the solid drug portions dispensed at the outlets of the dosing stations;
    each first mounting element having a position identifier;
    a controller configured to control the operation of the dosing stations, the at least one first conveyor belt, the second conveyor belt, and the packaging station; and
    an input device coupled to the controller for inputting the unique collector identifiers,
    wherein the controller is configured to maintain a mapping between the position identifiers and the unique collector identifiers of the collectors mounted to the first mounting elements.

2. The apparatus of claim 1, wherein the at least one first conveyor belt comprises a marker of a reference position that has a fixed relationship to the mounting positions of the first mounting elements, the marker being moved together with the first mounting elements, wherein the controller is coupled to a stationary reference position sensor for detecting the movement of the marker, wherein the position identifier assigned to each first mounting element or mounting position corresponds to or is a function of a distance of the mounting position from the reference position.

3. The apparatus of claim 1, wherein the mapping comprises status information associated to each unique collector identifier, the status information indicating an operating status of the corresponding collector.

4. The apparatus of claim 3, wherein the status information indicates at least one of whether the corresponding collector can be used for collecting drug portions and whether the corresponding collector has to be cleaned.

5. The apparatus of claim 1, the unique collector identifier of the collector being machine-readable, and the input device comprising a reader for reading the machine-readable unique collector identifier.

6. The apparatus of claim 5, wherein the reader is positioned in a fixed relationship to the at least one first conveyor belt so that the reader can read the machine-readable unique collector identifier of the collector mounted to the first mounting elements, when the first mounting elements are moved along the first path of movement.

7. The apparatus of claim 1, wherein the dosing stations are arranged in a plurality of parallel columns, each column comprising a plurality of dosing stations, the guiding ducts configured to guide the solid drug portions from the outlets of the dosing stations to the associated collecting receptacles.

8. The apparatus of claim 7, wherein the guiding duct and the associated collecting receptacle of each collector are separate and can be decoupled so that the collecting receptacle can be moved away from the guiding duct and subsequently coupled with another guiding duct.

9. A method of operating an apparatus for packaging dosed quantities of solid drug portions, said apparatus comprising a plurality of dosing stations for dispensing solid drug portions, a plurality of collectors for collecting dosed quantities of solid drug portions dispensed by the dosing stations and forwarding the dosed quantities of solid drug portions to a packaging station, each collector comprising a guiding duct and an associated collecting receptacle, at least one first conveyor belt for conveying the guiding ducts comprising a plurality of first mounting positions each for receiving one guiding duct, the first mounting positions arranged in a chain extending along a first path of movement of the at least one first conveyor belt, a second conveyor belt for conveying the associated collecting receptacles comprising a plurality of second mounting positions each for receiving one associated collecting receptacle, the second mounting positions arranged in a chain extending along a second path of movement of the second conveyor belt, a controller for controlling the operation of the dosing stations, the at least one first conveyor belt, the second conveyor belt, and the packaging station, and a reader coupled to the controller, the method comprising:
a) assigning a unique collector identifier to each guiding duct and attaching the unique collector identifier to each guiding duct,
b) detachably mounting each guiding duct to the at least one first conveyor belt at one of the first mounting positions, and successively reading the collector identifier of each mounted guiding duct by the reader, and associating the read collector identifier to a position identifier of the corresponding first mounting position,
c) maintaining a mapping of the unique collector identifiers and the associated position identifiers of the corresponding first mounting positions, and
d) conveying the collector along the dosing stations, so that the collector can receive the solid drug portions dispensed by the dosing stations, collecting solid drug portions by the collector and forwarding the collected solid drug portions to the packaging station.

10. The method of claim 9, wherein in step b) the unique collector identifier of each mounted guiding duct are read by successively moving all guiding ducts along the reader after all guiding ducts have been mounted to the at least one first conveyor belt, wherein the position identifiers of the corresponding first mounting positions are associated by assigning a start position to a first one of the guiding ducts positioned at the reader and associating running position numbers of the first mounting positions that are subsequently positioned at the reader.

11. The method of claim 9, wherein step d) comprises: observing, for each collector, the numbers of solid drug portions collected and forwarded by that collector, and associating, to each unique collector identifier, a parameter indicating a degree of contamination, the parameter depending on the amount of solid drug portions collected and forwarded by that collector.

12. The method of claim 11, wherein a collector is excluded from further collecting and forwarding of solid drug portions, if the parameter indicating a degree of contamination exceeds a predetermined threshold value.

13. The method of claim 11, wherein a cleaning required indication is associated to the unique collector identifier, if the parameter indicating a degree of contamination exceeds a predetermined threshold value.

14. The method of claim 11, wherein the collector is cleaned, if the parameter indicating a degree of contamination exceeds a predetermined threshold value, and the corresponding parameter indicating a degree of contamination is reset after cleaning.

15. The method of claim 14, wherein the guiding duct is detached from the first mounting position, then cleaned external to the apparatus, mounted again to the at least one first conveyor belt at one of the first mounting positions, wherein the collector identifier is read by the reader, and associated to the position identifier of the corresponding first mounting position.

16. The method of claim 15, wherein the guiding duct can be detached from the first mounting position, after the at least one first conveyor belt has moved the guiding duct to a demounting place, and wherein the guiding duct can be mounted again to the at least one first conveyor belt at one of the first mounting positions, after the at least one first conveyor belt has moved from that first mounting position to a mounting place.

17. An apparatus for packaging dosed quantities of solid drug portions, comprising:
a plurality of dosing stations for dispensing solid drug portions, each dosing station having an outlet;
a plurality of collectors configured to collect dosed quantities of solid drug portions dispensed by the dosing stations, each collector comprising a guiding duct, an associated collecting receptacle, and a unique collector identifier, the guiding ducts configured to guide the solid drug portions from the outlets of the dosing stations to the associated collecting receptacles;
at least one first conveyor belt comprising a plurality of first mounting elements at mounting positions arranged in a chain extending along a first path of movement of the at least one first conveyor belt, each guiding duct being detachably mounted to one of the first mounting elements and moved by the at least one first conveyor belt along the dosing stations:
a second conveyor belt comprising a plurality of second mounting elements at mounting positions arranged in a chain extending along a second path of movement of the second conveyor belt, each collecting receptacle being detachably mounted to one of the second mounting elements and moved by the second conveyor belt beneath the guiding ducts, each first mounting element having a position identifier;

a controller configured to control the operation of the dosing stations, the at least one first conveyor belt, the second conveyor belt, and a packaging station;

an input device coupled to the controller and configured to input the unique collector identifiers, wherein the controller maintains a mapping between the position identifiers and the unique collector identifiers of the collectors mounted to the first mounting elements, wherein the mapping comprises status information associated to each unique collector identifier, the status information indicating an operating status of the corresponding collector.

18. The apparatus of claim 17, wherein the controller is configured to provide a cleaning required indication to clean the collector based on a parameter indicating a degree of contamination exceeding a predetermined threshold value, the parameter based on the amount of solid drug portions collected and forwarded by the collector.

\* \* \* \* \*